Aug. 30, 1966  G. A. BONNER  3,269,372
THROUGH DOWEL CONSTRUCTION FOR ROTARY MECHANISMS
Filed June 3, 1964  4 Sheets-Sheet 1

INVENTOR.
GEORGE A. BONNER
BY Julian Falk
ATTORNEY

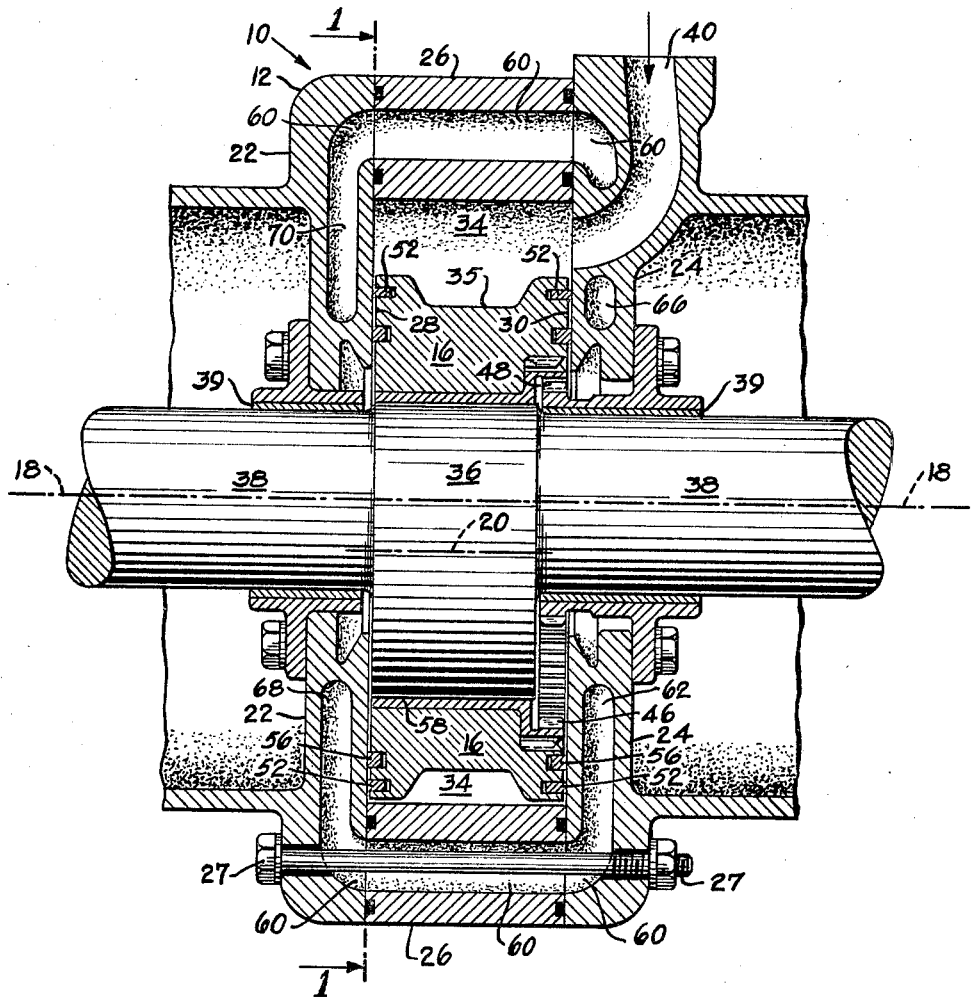

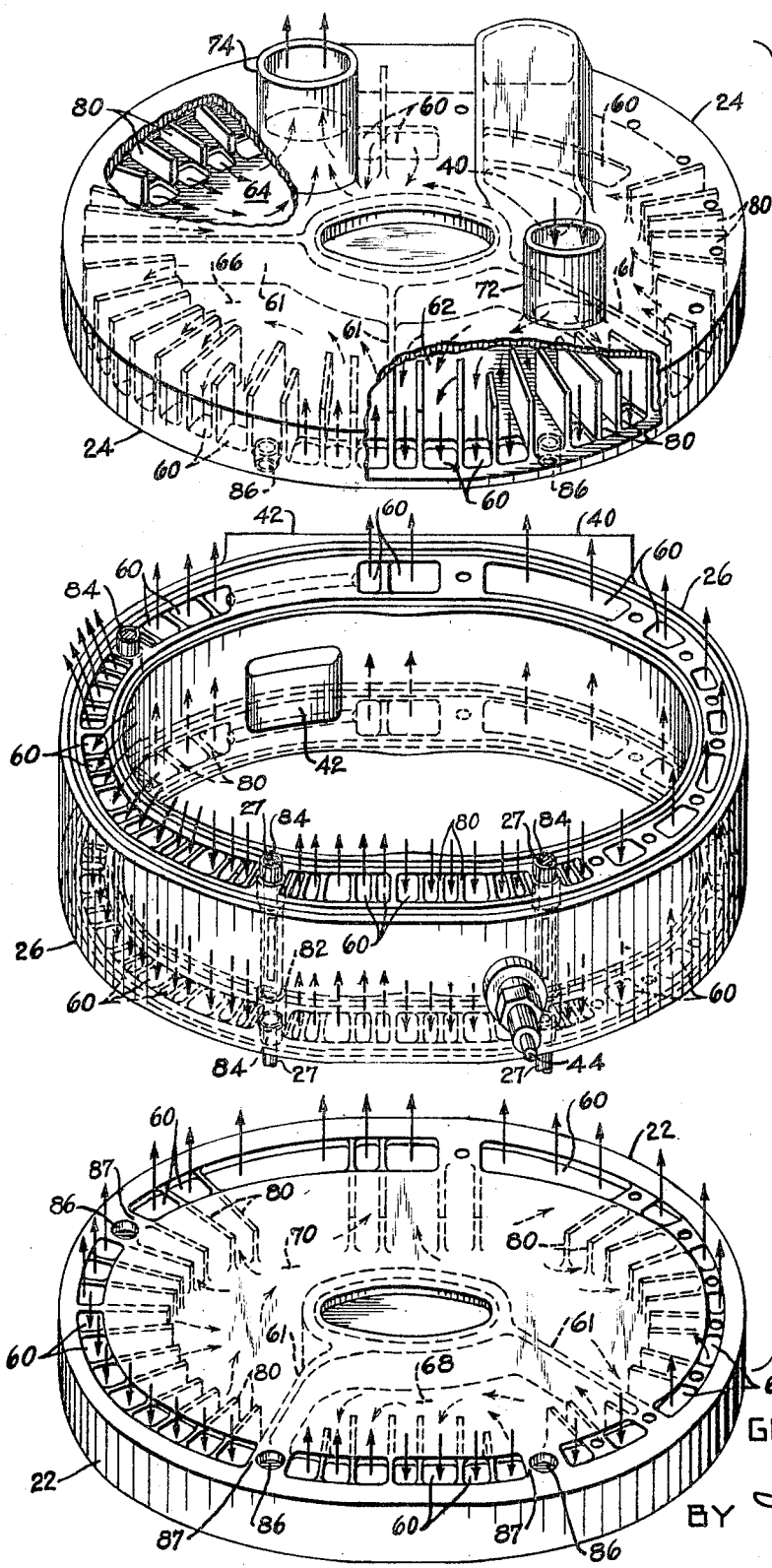

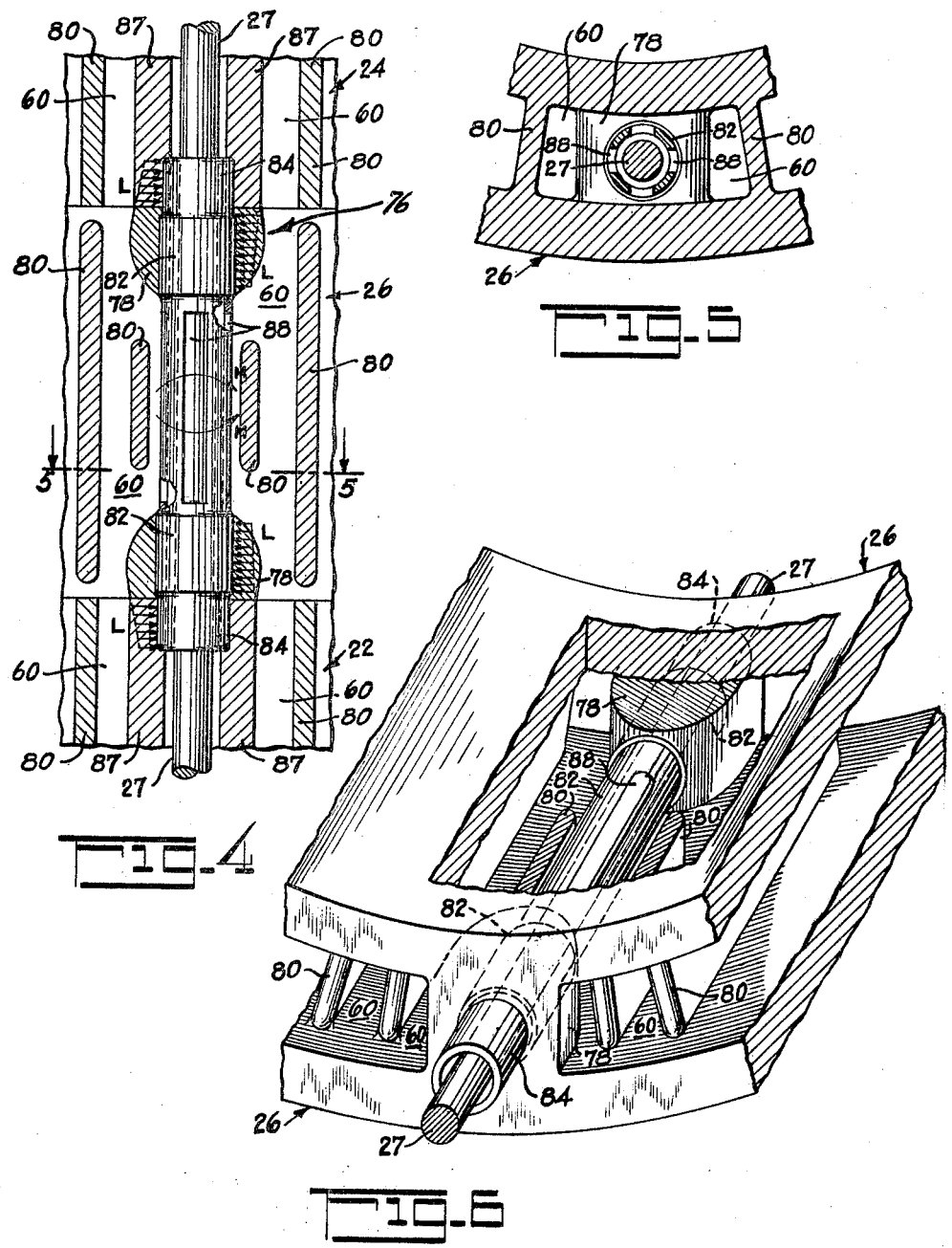

United States Patent Office 3,269,372
Patented August 30, 1966

3,269,372
THROUGH DOWEL CONSTRUCTION FOR ROTARY MECHANISMS
George A. Bonner, Palm Beach Gardens, Fla., assignor to Curtiss-Wright Corporation, a corporation of Delaware
Filed June 3, 1964, Ser. No. 372,217
4 Claims. (Cl. 123—8)

This invention relates to rotary mechanisms and is particularly directed to a novel and improved outer body or housing construction for a liquid cooled rotary combustion engine.

The invention is particularly useful in devices such as that disclosed in U.S. Patent 3,007,460, issued November 7, 1961, and is directed to an improvement over the outer body or housing construction of the type rotary mechanism disclosed therein.

When rotary mechanisms of the type disclosed in said patent are embodied in the form of a rotary combustion engine, as is well known, combustion always takes place adjacent the same region of the outer body and therefore, the heat input to the outer body is not uniform around the outer body periphery. It has also been found that the heat input is not uniform in the axial direction relative to the outer body axis in that the heat input is generally higher at the center region of the rotor housing than at the end portions thereof. Therefore, in order to maintain the outer body as a substantially rigid structure during operation, the thermal stresses and/or thermal distortions in this region of the outer body must be accounted for.

It has been further found that the region of the outer body including the portion wherein combustion takes place and the region adjacent the exhaust portion of the outer body are subjected to substantially higher stress than other regions of the outer body due to the pressure reaction resulting from the combustion process. In order to prevent the end housings and the rotor housing from being forced out of alignment due to the above mentioned thermal stresses and stresses due to the reaction from the combustion process, a dowel pin structure is provided in the high temperature and pressure region of the outer body which assembly transmits the stress load from the rotor or intermediate housing of the outer body to the end housings to maintain their housing sections in alignment. One form of dowel pin structure for transmitting stresses, as mentioned above, is shown in the aforementioned U.S. patent.

The loading of the dowel pins of the dowel pin structure increases significantly with increased high-speed and horsepower engine operation. In high performance engines a loading limit is reached at which time constructions, such as that shown by the aforementioned U.S. patent, fail. It will therefore be apparent that constructions of this type are unsatisfactory for high-speed, high-horsepower operation.

The present invention has for its prime purpose to provide a novel and improved aligning and clamping structure for the end and rotor housings in a liquid cooled outer body of a rotary combustion engine. The invention is generally carried out by providing a dowel structure which comprises a one-piece hollow dowel pin supported in and extending through the entire width of the rotor housing of the outer body with said one-piece dowel pin being carried in axially-spaced bosses within the cooling passages of a liquid cooled rotor housing. The dowel pin is made hollow to permit the engine tie bolts to pass therethrough for clamping the end housings and rotor housing together and also to permit coolant to pass therethrough for cooling the rotor housing in the area around and in line with the dowel pin. As used herein, the term tie bolt is intended to include machine screws, bolts, studs and like fastening means. A plurality of dowel pins are provided and preferably one or more of said pins are located in the high stress region of the outer body. In order to provide minimum restriction of the liquid coolant to this critical area for maximum cooling effect, the dowel pins are formed with a plurality of passages through the central portion thereof to permit the liquid coolant to flow substantially unrestricted in and out of the hollow dowel pin. By this means, the rotor housing in the dowel pin area and the supporting structure of said pins is kept sufficiently cool so that at high-speed operation, the structure is able to transmit the loads and the tie bolts do not significantly restrict the flow of coolant through the water jacket in this high heat input area.

Accordingly, it is one object of the invention to provide a novel and improved housing construction for a rotary mechanism.

It is another object of the invention to provide a novel and improved aligning and clamping construction for a multi-part housing of a rotary combustion engine.

It is a further object of the invention to provide a novel and improved dowel structure for a liquid cooled housing in a rotary combustion engine.

It is another object of the invention to provide a novel and improved dowel structure for a liquid cooled rotary combustion engine which permits a substantial increase in engine performance without loss in clamping support for the housing due to dowel assembly or rotor housing failure.

It is an additional object of the invention to provide a novel and improved housing dowel structure in a liquid cooled rotary combustion engine which more uniformly transmits loads for preventing stress concentration while at the same time provides a minimum restriction to the flow of liquid coolant through the housing water jacket.

Other objects and advantages of the invention will be best understood upon reading the following detailed description in connection with the accompanying drawings in which:

FIG. 2 is a sectional view taken along a broken line 2—2 of FIG. 1;

FIG. 3 is an exploded perspective view partly in section of the two end walls and intermediate or peripheral wall of the outer body shown in FIG. 1 but with the outer surface of the end walls somewhat simplified for convenience of illustration;

FIG. 4 is a sectional view taken along line 4—4 of FIG. 1;

FIG. 5 is a sectional view of the dowel pin structure taken along line 5—5 of FIG. 4 and FIG. 6 is a partial prespective view of a section of the peripheral wall of FIG. 1 with a portion thereof broken away to show the dowel structure of the invention.

Figure 1:
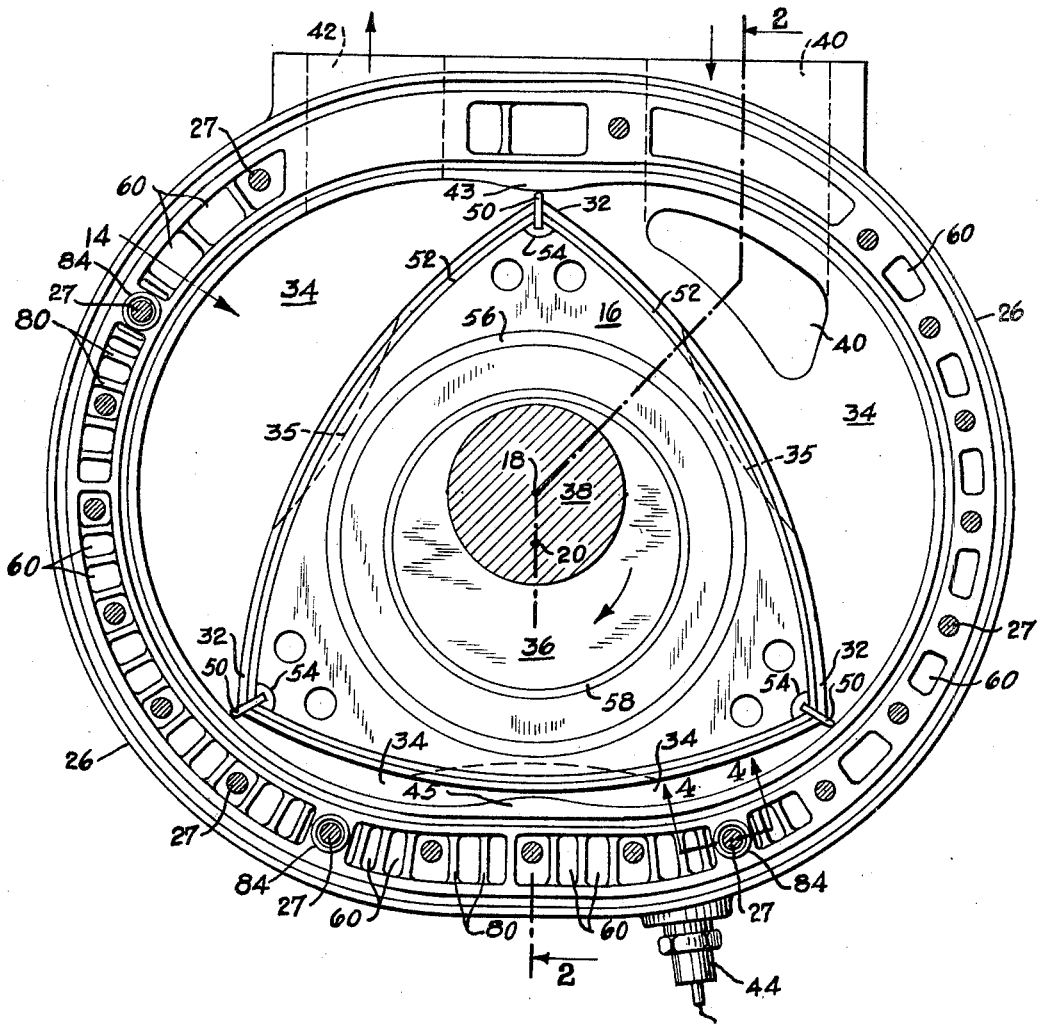
FIG. 1 is a transverse sectional view, taken along line 1—1 of FIG. 2 of a rotary combustion engine embodying the invention.

Referring first to FIGS. 1 and 2 of the drawing, a rotary internal combustion engine is indicated by reference 10. The engine 10 comprises a multi-part outer body or housing 12 having a cavity 14 within which an inner body or rotor 16 is received, said bodies being relatively rotatable and having laterally-spaced parallel axes 18 and 20 respectively. The multi-part outer body or housing 12 comprises axially-spaced end walls 22 and 24 and a peripheral or intermediate wall 26 interconnecting said end walls to form said cavity 14. The walls 22, 24 and 26 are secured together as by bolts 27. As will be explained in greater detail, below, the interconnection of the end walls 22 and 24 with the peripheral wall 26, particularly in the combustion zone of the engine, involves a critical relationship between the outer body elements and the means for securing them together. In a plane normal to its axis 18, the cavity 14 has a multi-lobed profile which preferably is basically an epitrochoid. In the specific embodiment illustrated the outer body cavity 14 has two lobes although as will be apparent the outer body cavity may have any number of lobes.

The inner body 16 has axially-spaced end faces 28 and 30 disposed adjacent to said outer body end walls and an outer surface with a plurality of circumferentially-spaced apex portions 32, said apex portions preferably being one more in number than the number of said outer body lobes. Thus, as illustrated, the inner body has three apex portions 32. The inner body apex portions 32 are in continuous engagement with the multi-lobed inner surface of the outer body to form a plurality (3 in the embodiment illustrated) of working chambers 34 between said two bodies which vary in volume upon relative rotation of the inner and outer bodies during engine operation. Between its apex portions the profile of the outer surface of the inner body is such as to operate in an interference free manner relative to the outer body. Thus, as illustrated, the outer surface of the outer body has a triangular profile with outwardly arched sides. Each working chamber 34 includes a trough-like recess 35 in the adjacent working face of the inner body 16, said recess forming a substantial part of said chamber during combustion therein.

In the embodiment illustrated, the outer body 12 is stationary while the inner body 16 is journaled on an eccentric portion 36 of a shaft 38. The shaft 38 is supported by bearings 39 carried by the outer body 12 and said shaft is co-axial with the geometrical axis 18 of the outer body 12 while the shaft eccentric portion 36 is co-axial with the inner body 16 which, as stated, is journaled on said eccentric portion. During engine operation, the inner body 16 has a planetary motion (clockwise in FIG. 1) about the axis 18 of the outer body whereupon the working chambers 34 vary in volume such that in each rotation of the inner body about the axis 18 of the outer body each chamber 34 has two positions of minimum volume and two positions of maximum volume.

An intake passage 40 for the engine working chambers 34 is provided in the outer body end wall 22 fo admitting a fuel-air mixture to the working chambers 34 and an exhaust passage 42 is provided in the peripheral wall 26 for exhausting combustion gases from said chambers, said passages being disposed on opposite sides of a junction 43 of the lobes on the outer body cavity with the exhaust port being on the upstream side of said junction relative to the direction of rotation of the inner body 16. The intake passage 40 may also be provided in the outer body peripheral wall 26 on the opposite side of the lobe junction 43 from the exhaust passage 42 instead of in the end wall 22 as illustrated. A spark plug 44 is provided in the outer body peripheral wall 26 on the side opposite to the intake and exhaust passages and adjacent to the lobe junction 45 for igniting the combustion mixture in the working chambers 34. As is apparent from the drawing, the lobe junction 43 and 45 are points of minimum radius on the multi-lobed profile at the inner surface of the peripheral wall 26.

During engine operation the working chambers 34 have a cycle of operation including the four phases of intake, compression, expansion and exhaust, said phases being similar to the strokes in a reciprocating-type internal combustion engine having a 4-stroke cycle. In order to maintain the relative motion of the inner body relative to the outer body, an internal gear 46 is, as illustrated, secured to the inner body and is disposed co-axially with the axis 20. The internal gear 46 is disposed in mesh with a fixed gear or external gear 48 secured to the outer body, said fixed gear being co-axial with the shaft 38. With the profile of the inner surface of the outer body cavity 14 having two lobes and the inner body 16 having three apex portions 32, the ratio of the diameters of the gears 46 and 46 is 3 to 2.

At this point it should be noted that although as illustrated and described the outer body 12 is stationary and the inner body 16 has a planetary motion about the axis 18 of the outer body, it will be apparent that either body may be stationary while the other rotates or both said bodies may rotate in the same direction about their own axes.

For effecient engine operation the working chambers 34 are sealed between the apex portions 32 of the inner body 16 and the peripheral wall 26 of the outer body 12 as well as between inner body end faces and the outer body end walls 22 and 24. The details of this sealing means for the working chambers 34 however, form no part of the present invention. As illustrated, this sealing means includes apex seal strip means 50 carried by the inner body 16 and extending along each apex portion 32 of said inner body for sealing engagement with the inner surfare of the peripheral wall 26 of the outer body 12, and the end face sealing means 52 carried by each end face of the inner body 16 with each end face sealing element 52 extending from one apex portion to the adjacent apex portion of the inner body for sealing engagement with the adjacent end wall of the outer body 12. In addition, intermediate seal members 54 are provided at each end of each apex portion of the inner body 16 for sealing co-operation between adjacent ends of the seals 50 and seal elements 52. An oil seal 56 may also be provided at each end face of the inner body 16 adjacent to the bearing 58 between said inner body 16 and the shaft eccentric 36.

As the engine operates, the various phases of the cycle of the engine working fluid in the working chambers 34 take place adjacent to the same portion of the outer body 12. Thus, for each working chamber 34 combustion is initiated by the spark plug 44, which as already described is located adjacent to the lobe junction 45 of the peripheral wall 26 of the outer body. With the inner body 16 in the position of FIG. 1, the lower working chamber 34 is approximately in a position for initiation for combustion in said chamber, combustion preferably having been initiated just prior to said chamber 34 reaching this position. Likewise, the engine intake portion 40 and exhaust port 42 serve each working chamber 34 and these ports are on the side of the outer body opposite to the spark plug 44. It will be apparent, therefore, that, as the engine operates, the rate of heat input or rejection to the outer body 12, resulting from the cycle of the gas (working fluid) in the working chambers 34, is not uniform about said outer body and instead is greatest on the side of said outer body adjacent to the spark plug 44. Also, it will be apparent that the stresses resulting from combustion of the gases in this area of the outer body will be greatest in this region and will result in great strain upon the outer body. It may therefore be seen that the cooling requirements and stress limitations of the outer body 12 vary considerably about its periphery. In the embodiment illustrated, a liquid coolant such as water is circulated through passages in the outer body for the purpose of adequately cooling said bodies so as to minimize variations in the temperatures at outer body about its periphery.

As explained in U.S. Patent 3,007,460 and illustrated in FIG. 3, the outer body 12 is hollow and is provided with a plurality of axially extending liquid coolant passages 60 over the periphery of said outer body. The passages 60 are divided by partitions in the end wall 24 into three manifold sections 62, 64 and 66 and in the end wall 22 into two manifold sections 68 and 70. An inlet conduit connection 72 is provided for the manifold sections 62 and an outlet conduit connection 74 is provided for the manifold sections 66. As explained in greater detail in the aforementioned patent, the liquid coolant flows in the inlet conduit connection 72 to the various manifold sections in the end walls and finally out of the exhaust conduit connection 74 after flowing axially back and forth through the passages 60 in the end walls 22, 24 and the peripheral wall 26. Reference may be made to the aforementioned U.S. patent for a more detailed explanation of the liquid coolant flow through the outer body, the particular details of which form no part of the present invention.

It will be apparent from the drawing that a greater number of cooling passages 60 per unit of area is provided in the region adjacent the spark plug 44 and in the region adjacent the exhaust port 42, or the region adjacent the combustion zone. As stated above, this is the region exposed to the greatest heat input and therefore the greatest amount of cooling is required in this region. It is particularly important in rotary combustion engines of this type to provide maximum cooling in this region to prevent the outer body from distorting or failing due to the intense heat produced. As explained above, a substantial amount of pressure will be produced in this region due to combustion which results in a substantial amount of stress being placed on the housing in a region of combustion.

In order to maintain alignment between the end walls 22, 24 and the peripheral wall or rotor housing 26 during operation, while the outer body is being subjected to substantial thermal and gas loads, a dowel pin structure is provided. The gas loads resulting from combustion are transmitted through the dowel pins of the dowel pin structure, and clamping friction between the rotor housing or peripheral wall 26 and the end walls 22 and 24, to said end walls and ultimately to the engine supporting mounts. The thermal loads resulting from the non-uniform heat input to the outer body, and the restraint against thermal distortion provided by the dowel pin structure, are taken out or absorbed internally by equal and opposite reactions at the dowel pin of the dowel pin structure. It has been found that the thermal loads on the dowel pins of the dowel pin structure increase significantly with high speed and horsepower engine operation. It has been further found when operating engines of this type at high-speed, high-horsepower and using dowel pin structures of the prior art type, a dowel pin load is reached which is not adequately handled by said prior art dowel pin structures such as, for example, the dowel pin structure shown in the aforementioned U.S. patent.

As stated above, the primary purpose of the invention is to provide a novel and improved dowel pin structure particularly for high performance engines. As in the case of the aforementioned U.S. patent, at least one or more dowel pin structures are preferably located in the region of highest thermal and gas loads or in the region of the combustion zone (FIG. 3). At least two such dowel pin structures are provided for aligning the end walls 22, 24 with the intermediate wall 26 and preferably three such structures are used, as illustrated in FIG. 3, although not limited to this number.

Referring to FIGS. 3–6, there is shown therein a dowel pin structure generally designated at 76. The dowel pin structure 76 comprises a pair of axially-spaced bosses 78 which are integral with the outer body peripheral wall 26 and disposed in a liquid coolant passage 60 at each end thereof. As shown in FIG. 4, for example the bosses of the dowel pin structure 76 are disposed between coolant passage ribs 80 in the circumferential direction. Each of the bosses 78 is provided with a bore therethrough for receiving a dowel pin member 82. The dowel pin member 82 is of one-piece construction and passes through the bore in the axially-spaced bosses 78 in tight fitting engagement therewith and extends across the entire width of the peripheral or intermediate wall 26 and projects therefrom at each side face of said peripheral wall 26. The projecting ends 84 of each of the dowel pins 82 mate with recesses 86 in the bosses 87 provided in each of the end walls 22 and 24 respectively during assembly of the engine 10. Therefore, it will be apparent that the projecting ends 84 of the dowel pins 82 when in mating engagement with the recesses 86 serve to maintain alignment of the end walls 22 and 24 with the peripheral wall 26.

Each dowel pin member 82 is made hollow as illustrated in FIGS. 4–6. When the engine is assembled, a tie bolt 27 is passed through each recess 86 in the end walls and through the center of the hollow dowel pin 82 for providing the clamping force for clamping the end walls to the peripheral wall 26. The clamping of the end walls 22 and 24 to the peripheral wall 26 may be seen to be analogous to the clamping of the cylinder head to the block in a reciprocating piston engine and it will be apparent that in both type engines the clamping force must be maintained during operation in order to prevent gas pressure leakage, liquid coolant leakage, etc. As shown, the diameter of the tie bolts 27 is smaller than the diameter of the bore in the hollow dowel pin 82 to permit the liquid coolant to flow axially through the dowel pin to the end housings 22 and 24.

As explained above, it is desirable to provide maximum cooling in a region adjacent the combustion zone since this is the region of greatest heat input. Means are provided in the dowel pin assembly 76 to minimize restriction of flow of the liquid coolant passages 60 at the portions of the peripheral wall 26 wherein the dowel pin structures 76 are located. As viewed in FIGS. 3–6 the boss members 78 are axially-spaced with one boss member 78 being positioned at each axial end of the peripheral wall 26 in an associated passage 60 which thereby provides for minimum restriction of the coolant flowing through the passage, particularly in the center portion thereof. The center portion of the dowel pin 82 which passes through the liquid coolant passage 60, is provided with a plurality of liquid coolant openings 88 therein to permit the liquid coolant to flow in and out of the hollow dowel pin 82 or in other words between the liquid coolant passage 60 and the interior of the dowel pin member 82. The tie bolts 27 are therefore provided with liquid coolant circulation between the passages 60 and the center of the hollow dowel pin 82 at the regions wherein said bolts pass through the hollow dowel pin so that during engine operation there will be a minimum distortion of the tie bolts 27 and as a result the clamping force will be substantially unaffected by the heat input in this region of the outer body. It will be seen therefore, that the liquid coolant may flow through the liquid coolant passages 60 with a minimum restriction from the dowel pin assembly 76 and that means are provided in the hollow dowel pin for aiding in cooling the engine tie bolts 27.

Referring to FIG. 4, the load distribution on the dowel pin is illustrated by arrows designated at L at each end of the dowel pin 82. In the prior art dowel pin assemblies, which did not extend across the entire width of the intermediate wall and were not of one-piece construction, the entire loading was substantially completely imposed on the outer ends thereof similar to that shown by the arrows L in FIG. 4. It was found however that when the load distribution L increased with increasing engine performance, a load was reached which could not be contained by the prior art type construction and failures would occur at the dowel pin bosses. As illustrated in FIG. 4, the one-piece hollow dowel pin 82 of the present invention extends across the entire width of the peripheral wall 26 with the center portion thereof designated at 92 providing equal and opposit internal dowel pin moments designated by arrows M which counteract the increase in loading at the ends of the dowel pin member 82. By this means a more uniform load distribution is provided between the dowel pin structure 76 and the outer body and hence there is a reduction in the resulting local stress in the peripheral wall or rotor housing at the dowel pin holes. The resulting increase in axial rigidity prevents the high local stresses at the dowel pin bosses that were present in the aforementioned prior structures. It will be seen therefore that the novel and improved dowel pin structure of the invention permits a nearly uniform transfer of loading between the dowel pin assembly and the outer body which allows for higher performance operation without failure in the dowel pin assembly or the rotor housing. The invention also provides for means to cool the clamping tie bolts for the end walls and peripheral wall of the outer body which results in a minimum of distortion between the end walls and the intermediate wall due to overheating of the tie bolts. Also, as mentioned above, the structure of the invention is such that a minimum amount of restriction is provided in the liquid coolant flow in this high heat input region of the outer body. This is accomplished while at the same time maintaining rigid structural alignment of the end walls 22, 24 with the peripheral wall 26.

While I have described my invention in detail in its present preferred embodiment, it will be obvious to those skilled in the art, after understanding my invention, that various changes and modifications may be made therein without departing from the spirit of scope thereof. It should also be understood that the invention is not intended to be limited to the particular coolant passage configuration illustrated.

I claim:

1. An outer body for a rotary combustion engine having an inner body supported for relative rotation with said outer body and means for initiating combustion adjacent one zone of said outer body such that said one zone of said outer body is exposed to relatively high temperatures and pressures than the remainder of said outer body, said outer body comprising
   (a) a pair of parallel spaced end walls;
   (b) an intermediate wall disposed between and interconnected with said end walls to form a cavity;
   (c) liquid coolant passage means in said end walls and said intermediate wall for flow of a liquid coolant between said end walls and said intermediate wall;
   (d) a dowel structure for maintaining alignment of said end walls with said intermediate wall, said dowel structure including;
   (e) a plurality of pairs of axially-spaced bosses carried by said intermediate wall at least in the one zone of said intermediate wall exposed to combustion with said bosses being disposed in the liquid coolant passage means of said intermediate wall;
   (f) a hollow dowel pin supported in each of said pairs of axially-spaced bosses, said hollow dowel pin extending across the entire width of said intermediate wall and projecting from each side thereof for mating engagement with a recess in each of said end walls such that loads imposed on said hollow dowel pin resulting from combustion adjacent the one zone of said outer body are distributed across substantially the entire length of said hollow dowel pin, and each said hollow dowel pin having a plurality of liquid coolant openings in the center portion thereof to provide for flow of liquid coolant between the interior of said hollow dowel pin and the adjacent liquid coolant passage means in said intermediate wall.

2. A housing clamping and aligning structure for the multi-part outer housing of a rotary combustion engine consisting of a pair of axially-spaced end walls and an intermediate wall disposed between said axially-spaced end walls and an intermediate wall disposed between said axially-spaced end walls, said clamping and aligning structure comprising:
   (a) dowel pin boss means including at least one pair of axially-spaced but aligned dowel pin bosses disposed in said intermediate wall at least in one region of said outer housing;
   (b) a hollow dowel pin supported in each pair of said dowel pin bosses with said hollow dowel pin extending across the entire width of said intermediate wall and projecting from each side thereof for mating engagement with a recess in each wall adjacent to said intermediate wall for maintaining alignment of said intermediate and end walls;
   (c) tie bolt means circumferentially-spaced around said outer housing and extending from one adjacent end wall on one side of said intermediate wall through said intermediate wall to the adjacent end wall on the opposite side of said intermediate wall for clamping said end walls to its associated intermediate wall, and at least some of said tie bolt means passing through said hollow dowel pins such that the clamping force means provided by said tie bolt means in said one region of said outer housing is substantially unaffected by high localized stresses in said outer housing;
   (d) liquid coolant passage means in each said end wall and said intermediate wall for flow of liquid coolant between said end walls and said intermediate walls; and
   (e) said hollow dowel pins having a plurality of openings in the center portion thereof to provide for flow of liquid coolant between the interior of said hollow dowel pin and an adjacent liquid coolant passage means.

3. A clamping structure for the outer housing of a rotary combustion engine as recited in claim 2 wherein
   (a) each said pair of axially-spaced bosses is disposed in a liquid coolant passage and so spaced so as to support its associated hollow dowel pin adjacent each end thereof and to minimize restriction by said hollow dowel pin and said bosses of the flow of liquid coolant through said liquid coolant passage means and between said hollow dowel pin openings and the adjacent liquid coolant passage means.

4. An outer housing for a rotary combustion engine having an inner body supported for relative rotation with said outer housing and means for initiating combustion between said outer housing and inner body adjacent one zone of said outer housing such that said one zone of said outer housing is exposed to relatively higher localized stress than the remainder of said outer housing, said outer housing comprising
   (a) a pair of parallel axially-spaced end walls;
   (b) an intermediate wall disposed between said axially-spaced end walls;
   (c) liquid coolant passage means in said end walls and said intermediate wall for flow of a liquid coolant through said intermediate wall and said end walls;
   (d) a plurality of pair of axially-spaced bosses carried by said intermediate wall in the one zone of said intermediate wall exposed to relatively high localized stress and each said pair of axially-spaced bosses being disposed in a liquid coolant passage of said intermediate wall;
   (e) a plurality of hollow dowel pins each carried by a pair of said axially-spaced bosses, each said hollow dowel pin having a portion extending beyond each side face of said intermediate wall and each said end wall having a plurality of recesses for receiving said extending portions of said hollow dowel pins so that said end walls and said intermediate wall are maintained in alignment, each said hollow dowel pin also having a one-piece construction extending across the entire width of said intermediate wall such that high localized stress in the said one zone of said intermediate wall are distributed across substantially the entire length of said hollow dowel pin and each said hollow dowel pin having a plurality of openings in the center portion thereof to provide for flow of liquid coolant between said hollow dowel pin and the liquid coolant passage in which its associated pair of axially-spaced bosses is disposed so that the flow of liquid coolant through said liquid coolant passage is substantially uninhibited by said hollow dowel pin and its associated axially-spaced bosses; and (f) tie bolt means circumferentially-spaced around said outer housing with said tie bolt means passing through said end walls and said intermediate wall for providing a clamping force for maintaining said end walls and said intermediate wall in tight fitting engagement and said tie bolt means also passing through said hollow dowel pin such that the liquid coolant flowing between said liquid coolant passage means and said hollow dowel pin will cool said tie bolt means so that the clamping force provided by said tie bolt means will be maintained in the said one zone of said outer housing.

References Cited by the Examiner
UNITED STATES PATENTS

| | | | |
|---|---|---|---|
| 2,993,482 | 7/1961 | Froede | 123—8 |
| 3,007,460 | 11/1961 | Bentele et al. | 123—8 |

MARK NEWMAN, *Primary Examiner.*

F. T. SADLER, *Assistant Examiner.*